// Patented June 29, 1937

UNITED STATES PATENT OFFICE 2,085,517

PROCESS FOR THE PREPARATION OF MUD-FLUSH

Pieter van Campen, Amsterdam, Netherlands, assignor to Shell Development Company, San Francisco, Calif., a corporation of Delaware No Drawing. Application January 25, 1934, Serial No. 708,247. In the Netherlands, January 26, 1933

7 Claims. (Cl. 255—1)

The invention relates to a process for the preparation of mudflush to be used in drilling.

The flush usually applied in drilling consists of a clay suspension, which is generally provided with weighting materials, such as barytes, hematite and the like, in order to obtain a flush which besides being easily pumpable has the highest possible specific gravity. High specific gravity is an essential requirement in the case of certain drillings, for example when drilling through strata in which gas or liquid is present under high pressure.

However, the use of weighting materials tends to increase the working expenses to a not inconsiderable extent, so that means have already been sought to economize on weighting materials.

It has now been found that it is possible to economize on weighting materials and that these can even be entirely avoided by using a clay which has been treated in such a manner that the smallest particles have been removed therefrom. It is, therefore, the use of clay treated in this manner that constitutes the feature of the process according to the invention. In fact, it appeared to be due to the presence of the smallest more or less colloidal particles of the clay that it is difficult to prepare mudflushes having a high specific gravity and a low viscosity.

In order to prepare a clay not containing these fine particles the clay, according to the invention, can be heated to a temperature above that whereby a loss of the constitution water sets in, but below that whereby sintering occurs.

By sintering, as usual in the ceramic industry, is meant the phenomenon whereby the clay begins to cluster and aggregates are formed having a greater mechanical resistance than say dried clay at 300° C.

The temperatures to be used generally lie between about 400 and about 900° C.

Care should be taken to keep the temperature below the sintering temperature, in view of the fact that otherwise it will be substantially more difficult to grind the clay to the desired fineness before preparing a mudflush thereof.

Example I

A suspension of a concentration of 14% is prepared from a Tjepoe-clay (Java). The S. F. viscosity is $\infty$. The specific gravity amounts to 1.10.

On preparing from the same clay a 14% suspension after it has been heated during ½ hour at 700° C. and ground in a ball-mill until it passes a sieve of about 30 meshes per cm., the S. F. viscosity thereof appears to be 9 sec.

From this heated clay it is possible to prepare a 60% suspension with specific gravity 1.60 having a viscosity of 25 sec.

Example II

From a Balik Papan clay (Borneo) a 33% suspension with specific gravity 1.26 is prepared. The viscosity amounts to 14 sec. S. F.

On preparing from the same clay a 33% suspension after it has been heated during 3 hours at 600° C. and subsequently ground in a ball-mill, the S. F. viscosity appeared to be 9 sec.

From this heated clay a 60% suspension can be prepared having a specific gravity of 1.60 and a S. F. viscosity of 24 sec.

According to the invention it is further possible to prepare a clay not containing the smallest particles by fractional sedimentation. This can be done, for instance, by allowing to stand over for some time or e. g. quietly stirring in a tank an ordinary clay flush liquid—if necessary after thinning with water and adding some soda, water-glass, humic acids, tannic acid, extract of chestnut-wood or other similar substances likewise used for reducing the viscosity of mudflush—whereby the coarser constituents substantially accumulate on the bottom, after which the liquid thereabove can be removed together with the smallest particles. The residue can then be used as a mudflush or can be added as weighting material to a light flush already existing, as a result of which one obtains clay flushes of a higher specific gravity than that started from, whilst retaining a sufficiently low viscosity. If the conditions prevailing at a certain drilling call for the use of this heavier flush, one can save the expense for the requisite quantity of barytes by treating a corresponding quantity of flush not in use or a quantity of clay in the manner described above and weighting the clay flush with the product obtained to the desired specific gravity.

The object aimed at can also be attained by treating the clay with inorganic acids, whereby the smallest particles are dissolved. Another method consists in bringing a layer of water on top of a thin layer of clay on the bottom of a vessel, whereby the fine clay particles diffuse into the water layer, which is then removed in a suitable manner, e. g. by decantation.

I claim as my invention:

1. In the process of preparing an easy flowing mudflush from a clay normally producing an excessively viscous water suspension, the steps of reducing in said clay the content of the finest gel-forming colloidal particles to produce a clay consisting substantially of colloidal-size non-gelling particles and then using this clay to form the mudflush.

2. In the process of preparing clay for making an easy flowing drilling mud from a clay containing an excessive amount of fine gel-forming colloidal particles, the steps of subjecting the clay to heating at a temperature from about 400° C. to about 900° C., which temperature is substantially below the sintering point of the clay but sufficiently high to cause a loss of the constitution water present in the clay, and then grinding the clay to a sufficient fineness to permit forming a stable suspension thereof in water.

3. In the process of preparing an easy flowing drilling mud from a clay containing an excessive amount of fine gel-forming colloidal particles, the steps of suspending the clay in water, maintaining the resulting suspension quiescent for a time sufficient to allow a substantial portion of the suspended clay to separate by gravity from the portion consisting substantially of the fine gel-forming colloidal particles, thereby forming two different portions of the suspension, separating the portion containing substantially only the fine gel-forming colloidal particles of clay from the other portion of the suspension, and using this other portion to form an easy flowing drilling mud.

4. In the process of claim 3, incorporating into the clay suspension prior to the step of separating it into two portions a viscosity reducing agent selected from the following group: soda, waterglass, humic acid, tannic acid and extract of chestnut wood.

5. A drilling mud comprising an aqueous suspension of calcined clay having a low yield point.

6. A drilling mud comprising an aqueous suspension of calcined clay having a high degree of stability against settling and an uncalcined clay.

7. A drilling mud comprising clay free from at least part of its chemically combined water and having a low yield point.

PIETER v. CAMPEN.